Figure 1:
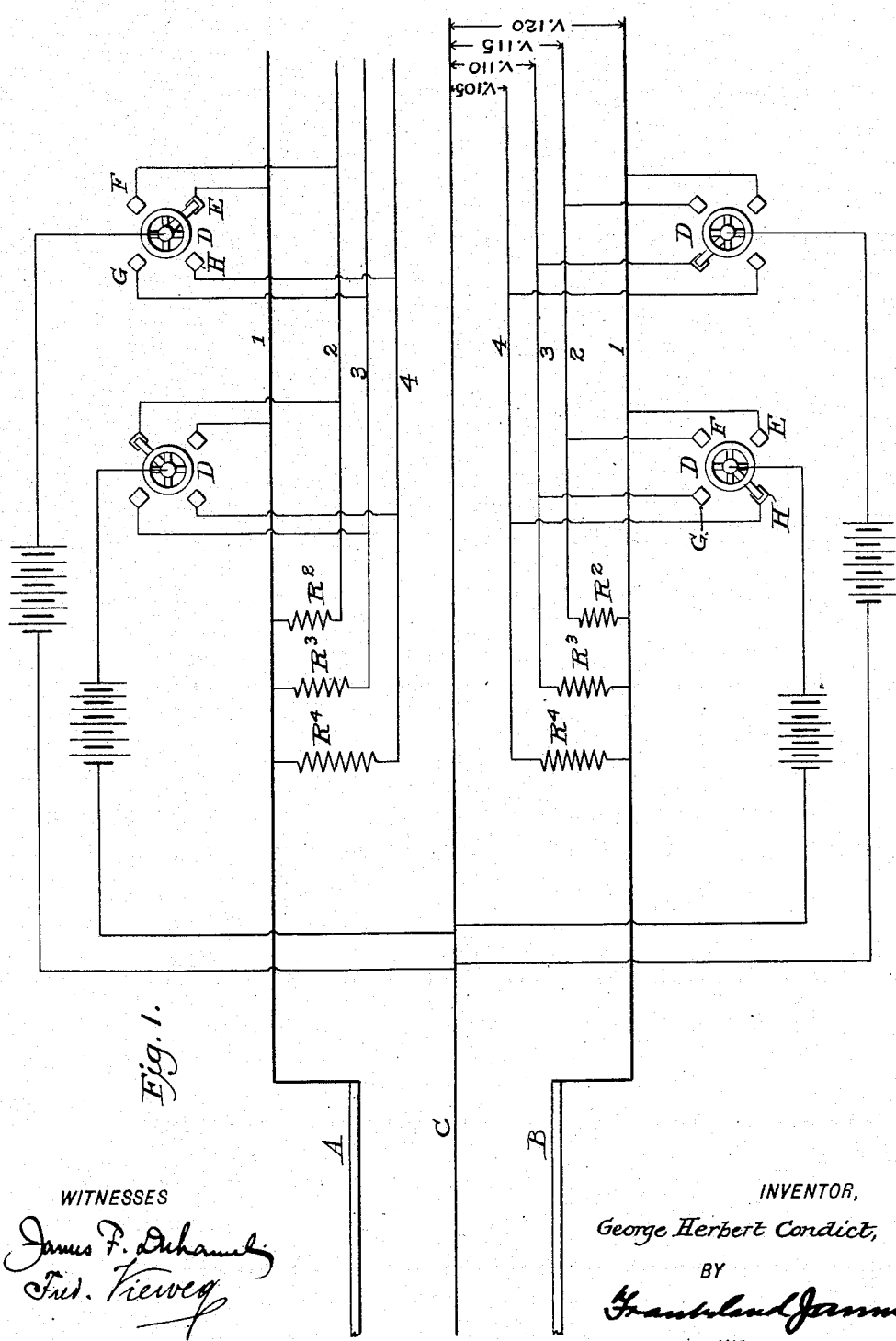

No. 677,156. Patented June 25, 1901.
G. H. CONDICT.
SYSTEM OF CHARGING STORAGE BATTERIES.
(Application filed Aug. 4, 1898.)

(No Model.) 2 Sheets—Sheet I.

WITNESSES
James F. Duhamel
Fred. Vieweg

INVENTOR,
George Herbert Condict,
BY
Frankland Jannus
HIS ATTORNEY

No. 677,156. Patented June 25, 1901.
G. H. CONDICT.
SYSTEM OF CHARGING STORAGE BATTERIES.
(Application filed Aug. 4, 1898.)
(No Model.) 2 Sheets—Sheet 2.

WITNESSES
James F. Duhamel
Fred. Vieweg

INVENTOR,
George Herbert Condict,
BY
Frankland Jannus
HIS ATTORNEY

THE NORRIS PETERS CO., PHOTO-LITHO., WASHINGTON, D. C.

UNITED STATES PATENT OFFICE.

GEORGE HERBERT CONDICT, OF NEW YORK, N. Y., ASSIGNOR TO THE ELECTRIC VEHICLE CO., OF SAME PLACE.

SYSTEM OF CHARGING STORAGE BATTERIES.

SPECIFICATION forming part of Letters Patent No. 677,156, dated June 25, 1901.

Application filed August 4, 1898. Serial No. 687,698. (No model.)

*To all whom it may concern:*

Be it known that I, GEORGE HERBERT CONDICT, a citizen of the United States of America, and a resident of New York, in the county of New York and State of New York, have invented certain new and useful Improvements in Systems of Charging Storage Batteries, of which the following is a specification.

This invention relates to improvements in systems of charging storage batteries, (Case B;) and it comprises a complete arrangement of electrical apparatus, circuits, switches, cut-outs, and signals for carrying the invention into effect, as set forth in a separate application for Letters Patent, filed concurrently, in which said other application the system is claimed in its broadest sense.

According to the present invention I have devised means for producing differences of electrical pressure and for conveying the same to the batteries to be charged without the employment of a number of independent generators.

In this system of charging storage batteries it is necessary to provide means for connecting the charging-circuit progressively with two or more supply-circuits having different potentials. In order to prevent confusion and to secure effective operation, it is also necessary to provide a device in each charging-circuit to indicate to the attendant that the current flowing therein is within certain defined limits. When the charging-current has fallen to a point at which the battery is not receiving an effective supply or when the charging-current has increased through any means to such an extent that damage would result to the batteries should such charging continue, it is necessary to call the attention of the attendant to the fact by some signal, preferably the ringing of a bell or lighting of a lamp. I have therefore invented and use in carrying out the present system a number of important details in the construction, arrangement, mode of operation, and effectiveness of the apparatus employed, as will appear from the following description, taken in connection with the accompanying drawings. I do not, however, limit myself to the details of construction herewith shown, as these may be varied in many particulars without departing from the invention.

Figure 2:
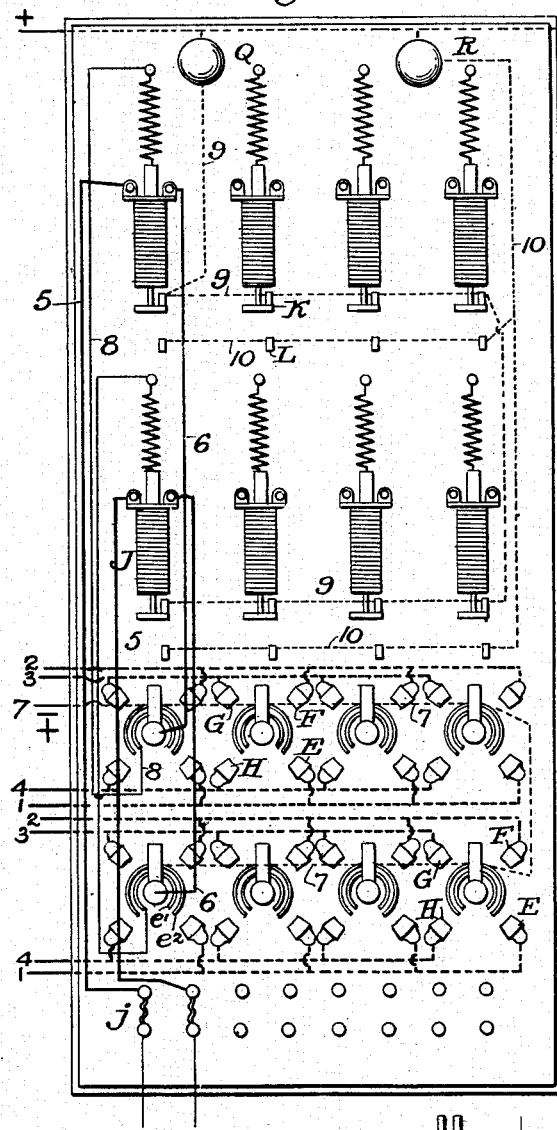
Figure 3:
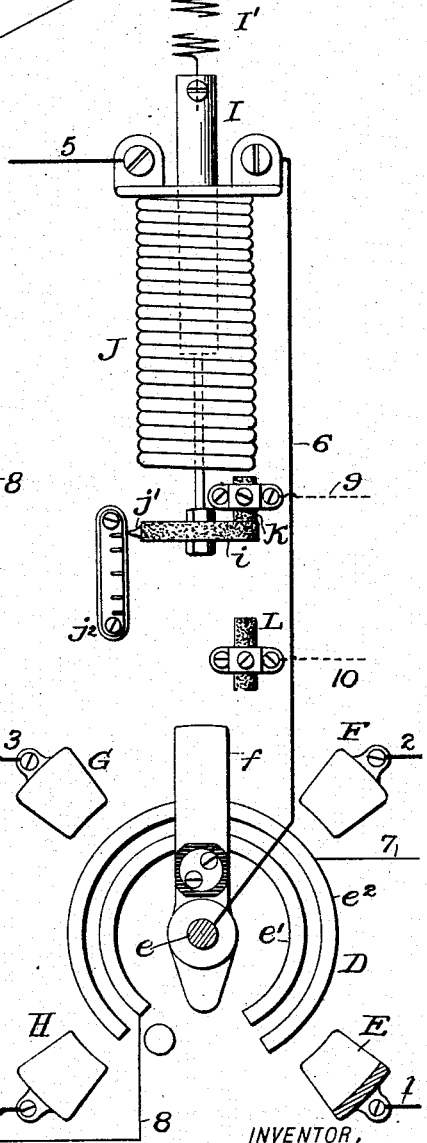
Figure 4:
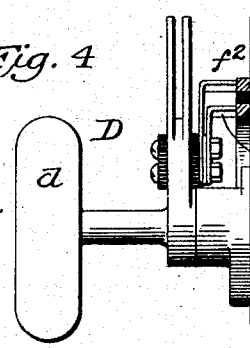

In the accompanying drawings, Figure 1 is a diagrammatic view of a system of circuits, switches, resistances, and supply-conductors embodying the invention. Fig. 2 is a view in elevation showing one panel of a switchboard containing the indicators, switches, and connections. Fig. 3 is an enlarged detailed view showing in elevation one of the indicators and switches with their circuit connections. Fig. 4 is a side or edge view of the switch shown in Fig. 3.

In the drawings, Fig. 1, A and B are the positive and negative conductors of a three-wire supply system, and C is the neutral or balancing conductor. The circuit A B C, as here indicated, is a regular city distributing-circuit supplying current at the usual voltage for the operation of lamps, motors, &c., and since, because of my invention, the voltage of the various circuits has to be considered, we will assume that there is a constant difference of potential between each of the main conductors A and B and the conductor C of one hundred and twenty volts.

In order to charge storage batteries to the best advantage, I connect them with a number of circuits in succession, the potential of each circuit being a step up from that which preceded it. To accomplish this, I provide a switch D, having, say, four divisions, represented by metallic jaws E F G H, which are arranged about a rotatable central shaft $e$, to which is attached the contact-bar $f$.

The supply-circuits, bus-bars 1 2 3 4, representing the different potentials, are connected with the contact-jaws E F G H, and the contact-piece $f$ is adapted to engage one or other of the said contact-jaws by turning the hand-wheel $d$ to close the charging-circuit connected therewith upon any one of the supply-circuits mentioned. Of the supply-circuits indicated in the diagram Fig. 1 conductor 1 carries the full potential of the supply-circuit. Conductor 2 is connected with the supply-circuit through a resistance $R^2$, which is so graduated as to secure a voltage in the supply-conductor or bus-bar 2 of one hundred and fifteen volts. The conductor or bus-bar 3 is connected with conductor 1 of the supply-circuit through resistance $R^3$, which reduces the voltage in said bus-bar 3 to, in this instance, by way of illustration, one hundred and ten volts. In like manner the conductor or bus-bar 4 is connected with conductor 1 of the supply-circuit through resistance $R^4$, which further reduces the voltage of the current flowing into bus-bar 4, which may, as indicated, be adjusted at one hundred and five volts.

I am well aware that variable resistances for altering the potential of the electric current have been used; but heretofore a separate resistance has been placed in each of the charging-circuits where a number of batteries were used—i. e., there were as many resistances as there are circuits for charging. This method introduces a large number of parts and much complication into the charging plant. I therefore employ a single resistance between the circuit carrying the full voltage and each of the remaining charging-circuits, varying this resistance as necessity requires in order to maintain each of the charging-circuits at a constant voltage. Any number of bus-bars may be employed, and a circuit may be reduced to any desired degree by interposition between said bus-bars and supply-circuit of any desired resistance.

Two of the switches D are shown on one side of Fig. 1 connected with the respective bus-bars and two storage batteries are shown connected with the switches, the one being charged from bus-bar No. 4, which delivers current at the lowest potential, while the other circuit is receiving current from bus-bar No. 3.

The arrangement just described is that which would be employed in the case of an ordinary circuit of two conductors B and C; but the main or public supply-circuit here shown is of the three-wire system, so that the apparatus just described, bus-bars, resistances, and switches, are duplicated, as shown. The switchboard here shown will accommodate eight charging-circuits and is to be extended as desired. It also contains eight of the switches D and eight of the automatic indicators employed in connection therewith, one of which will now be described.

J is a solenoid included in the charging-circuit and connected by conductor 5 on one side with the fuse-plug $j$ on the switchboard and on the other side by conductor 6 with the axis $e$ of the switch D, which is electrically connected by contact-piece $f$ with one or other of the contact-jaws E F G H, representing the bus-bars 1 2 3 4. Two metallic segments $e'$ $e^2$ surround the axis $e$ of the switch D and are electrically connected by means of a pair of metallic brushes $f'$ $f^2$ and secured to and moving with the contact-arm $f$. These segments and the conductors 7 8, connected therewith, each form one side of and control the two signaling-circuits, as will appear.

I is a core, of soft iron, as usual, and moves within the solenoid J, being restrained or controlled by a suitable adjustable tension-spring $I'$. The lower end of the core I of the solenoid J is extended to form a contact $i$ and provided with a pointer $j'$, which moves vertically adjacent to a scale $j^2$ to indicate the flow of current in the solenoid J. Stationary contacts K L, representing the conductors 7 8 of the signaling-circuit, limit the upward and the downward movement of the contact-piece $i$. Conductors 9 and 10 are connected to the stops K L and complete the signal-circuits. With this construction when the current has fallen to a predetermined point in the charging-circuit the spring $I'$, supporting the core I of the solenoid, will pull it up until the depending contact-piece engages the stop K, when the circuit will be closed through a lamp or bell Q. This indicates to the attendant that the flow of charging-current has fallen to or below a predetermined point, for the reason that the battery has been charged as fully as the current of that potential can charge it. He will then by turning hand-wheel $d$ of switch D change the charging-current to one of higher potential, which will then flow in the charging-circuit, including the coils of the solenoid J, and by drawing in the core thereof will open the circuit of the lamp or bell, which was closed through the stop K, the core of the solenoid, and the conductors 7 8 9, and at the same time indicate upon the scale $j^2$ the strength of the current flowing in the charging-circuit and traversing the coils of the solenoid. The signal Q is preferably a green lamp, which when lighted by the diminution of the flow of charging-current, as described, indicates that the charging-circuit should be switched to a bus-bar of higher potential or that the charging-circuit should be opened, as by breaking the contact between the arm $f$ and the contact-segments. It will be obvious that any conspicuous signal operating by the flow of current might be substituted for the green lamp Q. Conversely, when the flow of current in the charging-circuit is increased by switching in a bus-bar of higher potential the plunger I will be drawn into the solenoid J, breaking contact between the contact-piece $i$ and the stop K. Should the flow of current from the next higher potential bus-bar be excessive, the plunger I will be drawn into the solenoid to its fullest extent, in which position the contact-piece $i$ will be depressed until it makes contact with the stop L, which will close the second signaling-circuit through conductors 8 and 10 and the red lamp R, and thence to one of the main conductors, indicating that an excessive current is flowing in the solenoid and directing attention thereto. When the excessive flow of current ceases, the core I will rise under the action of its tension-spring $I'$, breaking the circuit of the red lamp R by lifting the contact-piece $i$ from the contact L. The flow of current when between maximum and minimum will be indicated, as before stated, by the position of the indicator $j$ with reference to the scale $j^2$. While a red lamp is described in connection with this circuit, it will be obvious that any conspicuous signal distinguishable from the signal Q and operated by a flow of current may be substituted without departing from the invention. When the flow of current in the charging-circuit, as just described, again diminishes, the core I of the solenoid will be proportionately withdrawn therefrom by its tension-spring and, lifting the contact-piece $i$ from the stop L, will open the circuit of the lamp or signal R and stop its operation until finally the contact-piece $i$ is moved to its farthest extreme in the opposite direction and again engages the stop K, which closes the circuit of the signal Q, which then becomes operative, indicating that the charging-circuit should be changed to a source of still higher potential or cut out altogether.

Having described my invention, what I claim is—

The combination in a system for charging storage batteries, of a common source of supply, a plurality of circuits of different potential, circuit for the battery to be charged, actuating means for controlling the circuits of different potential including conspicuous signals, and a single operating means for connecting the battery-circuit in the circuits of different potential.

Signed by me at New York, N. Y., this 3d day of August, 1898.

GEORGE HERBERT CONDICT.

Witnesses:
FRANKLAND JANNUS,
CHAS. M. MAXWELL.